United States Patent
Shimamoto et al.

(10) Patent No.: US 6,280,483 B1
(45) Date of Patent: Aug. 28, 2001

(54) METHOD OF MANUFACTURING SOLID ELECTROLYTIC CAPACITORS

(75) Inventors: Yukari Shimamoto, Kyoto; Tsuyoshi Yoshino, Kameoka, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/493,003

(22) Filed: Jan. 28, 2000

(30) Foreign Application Priority Data

Jan. 28, 1999 (JP) .................................................. 11-19485

(51) Int. Cl.$^7$ ................................. H01G 9/00; H01G 9/04
(52) U.S. Cl. .......................... 29/25.03; 361/523; 361/528
(58) Field of Search ............................... 29/25.01–25.03; 361/523–528

(56) References Cited

U.S. PATENT DOCUMENTS 5,882,719 * 3/1999 Creasi, Jr. ................................. 427/8

* cited by examiner

Primary Examiner—John F. Niebling
Assistant Examiner—Ha Tran Nguyen
(74) Attorney, Agent, or Firm—Parkhurst & Wendel, L.L.P.

(57) ABSTRACT

A method of manufacturing solid electrolytic capacitors which prevents decrease in product yield due to degradation in characteristics of anode foil during a process of forming a $MnO_2$ layer, and achieves high quality solid electrolytic capacitors with high yield, wherein aluminum foil is sampled from each lot before inputting the lot into the next process of forming $MnO_2$ layer on a surface of aluminum foil, and a predetermined inspection is implemented after forming the $MnO_2$ layer on this sample. Based on inspection results, the lot of the sample is input to the next process. This method prevents occurrence of defects in the $MnO_2$ layer formation process in advance, and avoids finding defects after inputting the entire lot of aluminum foil to the $MnO_2$ layer formation process. Consequently, highly reliable solid electrolytic capacitors are manufactured inexpensively and stably without loss in costs and efficiency.

12 Claims, 3 Drawing Sheets

METHOD OF MANUFACTURING SOLID ELECTROLYTIC CAPACITORS

FIELD OF THE INVENTION

The present invention relates to the field of methods of manufacturing solid electrolytic capacitors (hereafter referred to as "solid capacitors") using conducting polymer as solid electrolyte. In particular, the present invention relates to the field of methods of manufacturing solid electrolytic capacitors to provide an anode foil whose characteristics of the anodized film degrade to a lesser extent during the formation process of the $MnO_2$ layer which becomes the base of the conducting polymer layer to the following process.

BACKGROUND OF THE INVENTION

A conventional method of manufacturing solid capacitors is described next with reference to drawings. FIG. 5 shows a perspective, partly in section, illustrating the configuration of a solid capacitor. In FIG. 5, after the surface of an aluminum foil 1, which acts as the anode (positive electrode), is roughened by etching, an anodized film is formed on the surface of the roughened aluminum foil 1 through anodization. An insulative resist 11 separates the aluminum foil 1 into an anode and cathode (negative electrode). The cathode is made by sequentially laminating a $MnO_2$ layer 12, polypyrrole layer 13 which becomes the conducting polymer layer, graphite layer 14, and silver paint layer 15. A solid capacitor element is configured as described above.

A single or multi-laminated solid capacitor element as configured above is molded with a packaging resin 17 (not illustrated) after terminal members 16A and 16B are connected to the anode and cathode. This completes the solid capacitor.

In the conventional method of manufacturing solid capacitors as above, the aluminum foil 1, the initial material, is generally provided in the form of a strip of predetermined length wound around a reel. The aluminum foil 1 wound around one reel is considered as one lot, and is successively supplied to the above series of processes. Accordingly, if the characteristics of the aluminum foil vary significantly in the processes relatively close to raw materials, the product yield may drop in the conventional manufacturing method.

More specifically, during the process of forming the $MnO_2$ layer 12 on an anodized film of the aluminum foil 1 in FIG. 5, a strip of the aluminum foil 1 is successively immersed in and removed from a solution containing manganese salts. The manganese salt is then thermally decomposed to form the $MnO_2$ layer 12 on the surface. This process has a marked detrimental effect on the anodized film already formed on the aluminum foil 1, often resulting in damage to some parts of the anodized film.

Accordingly, another anodization step is implemented after the $MnO_2$ layer formation process in order to repair the damaged anodized film. However, this repair process is not always sufficient. Considering the degradation in characteristics of the anodized film on an aluminum foil (hereinafter referred as characteristics of the aluminum foil) 1 during the $MnO_2$ layer formation process, the entire lot of aluminum foil 1 rolled on the reel may not be reliably input to the following $MnO_2$ layer formation process.

The present invention aims to offer a method of manufacturing solid electrolytic capacitors that allows the reliable input of the entire lot of aluminum foil, on which an anodized film is formed, to the $MnO_2$ layer formation process, and also to improves the product yield.

SUMMARY OF THE INVENTION

The method of manufacturing solid capacitors comprises the steps of:
- sampling a part of aluminum foil, on which an anodization film is formed on its surface, from the lot;
- forming the $MnO_2$ layer on this sample;
- inspecting the sampled aluminum foil on which the $MnO_2$ layer is formed using a predetermined inspection method; and
- determining whether to input the lot from which the aluminum foil is sampled to the $MnO_2$ layer formation process used in solid capacitor formation.

The present invention thus eliminates defective aluminum foil being found after inputting the entire lot of aluminum foil to the $MnO_2$ layer formation process. This allows to stably and inexpensively to manufacture solid electrolytic capacitors with high reliability without loss in costs and efficiency.

DESCRIPTION OF THE PREFERRED EMBODIMENT

Exemplary embodiments of the present invention are described in detail with reference to drawings.

First Exemplary Embodiment

Figure 1:
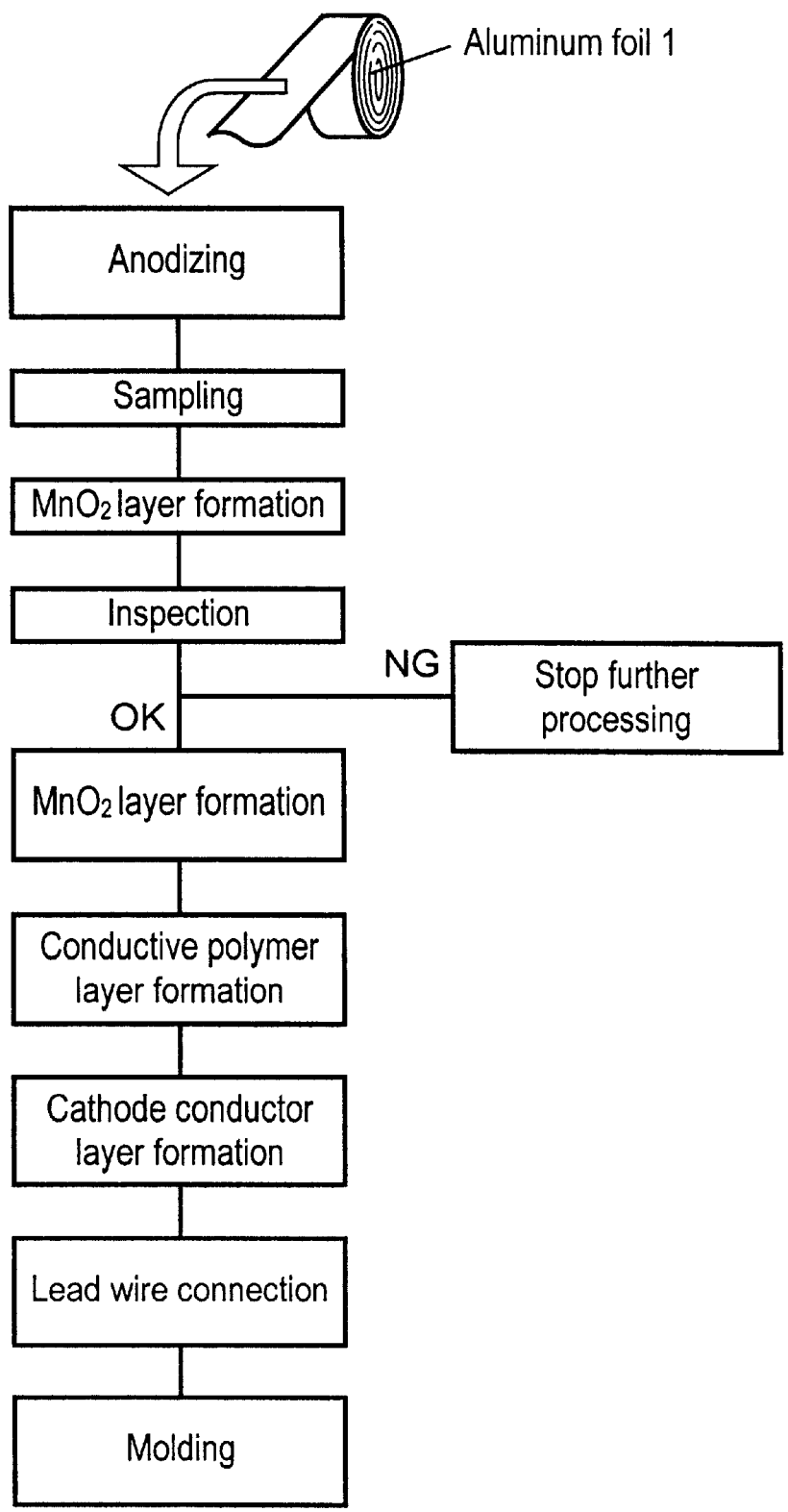
FIG. 1 is a flow chart of a method of manufacturing solid electrolytic capacitors in accordance with a first exemplary embodiment of the present invention.

FIG. 1 shows a flow chart of a method of manufacturing solid electrolytic capacitors in a first exemplary embodiment of the present invention. As shown in FIG. 1, an anodized film is formed on the surface of a strip of aluminum foil 1 having a predetermined length, which comprises one lot, by roughening the surface of the aluminum foil 1 and then anodizing it. A part of the aluminum foil 1 whose surface is anodized is sampled and designated as sample 1A. The sample 1A is dipped in a solution containing manganese salts, removed from the solution, and thermally decomposed to form a $MnO_2$ layer on the surface of the sample 1A. The formation of the $MnO_2$ layer on the sample 1A is implemented under the same conditions as those for the $MnO_2$ layer formation process in the product process.

Figure 2:
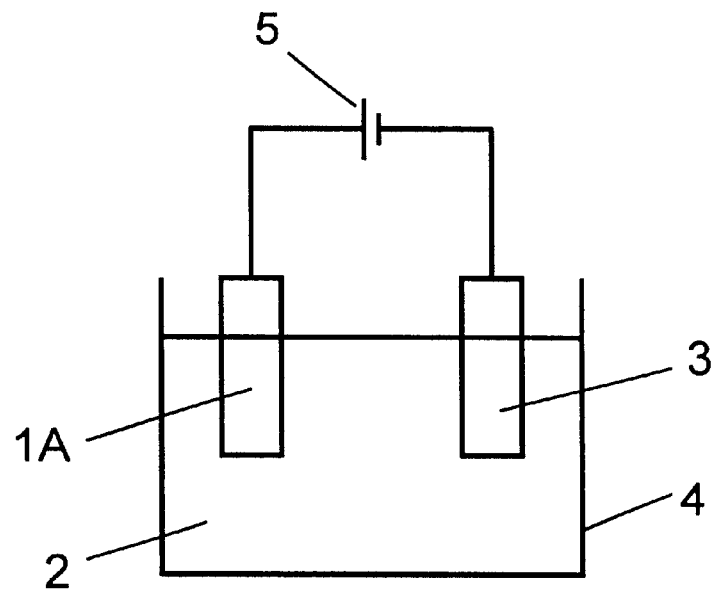
FIG. 2 illustrates a concept of a method for inspecting samples.

After the $MnO_2$ layer is formed on the surface of the sample 1A, inspection shown in FIG. 2 is applied to the sample 1A as a test specimen.

FIG. 2 is a conceptual drawing illustrating the inspection method for the sample 1A. As shown in FIG. 2, the sample 1A and cathode plate 3 are immersed into the electrolytic solution 2 contained in a test vessel 4. A power source 5 is connected to both sample 1A and cathode plate 3. This inspection equipment is designed to measure the current flowing from the sample 1A to the cathode plate 3 when the potential of the sample 1A is swept at a constant rate from 0 V.

Figure 3:
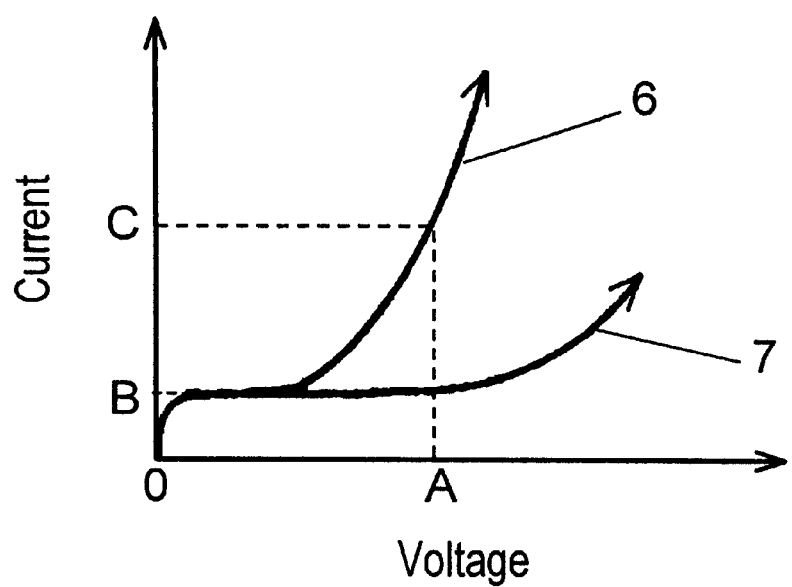
FIG. 3 illustrates characteristics of samples measured in the inspection.

FIG. 3 shows an example of the inspection results. A curve 6 in FIG. 3 shows the measured characteristics of the sample 1A, and a curve 7 shows the characteristics of the sample 1A before the $MnO_2$ layer is formed. It is apparent from FIG. 3 that the anodized film is significantly damaged as a result of forming the $MnO_2$ layer on the surface of the aluminum foil where the anodized film is already formed. Damage to the anodized film allows a large current to flow even if the same voltage is applied, as shown in FIG. 3, which indicates that the characteristics of the aluminum foil have degraded. These changes in characteristics differ among different lots of aluminum.

The present invention thus specifies the current level (Points B and C) before and after the formation of the $MnO_2$ layer at a predetermined voltage as shown by Point A on the X axis in FIG. 3. Acceptable aluminum lots are identified using this change in the current level or the upper limit of the current level (Point C) after the formation of the $MnO_2$ layer as a control level. Only lots determined as acceptable are input to the next process. Those determined as defectives are rejected, and not input to the next process.

Figure 5:
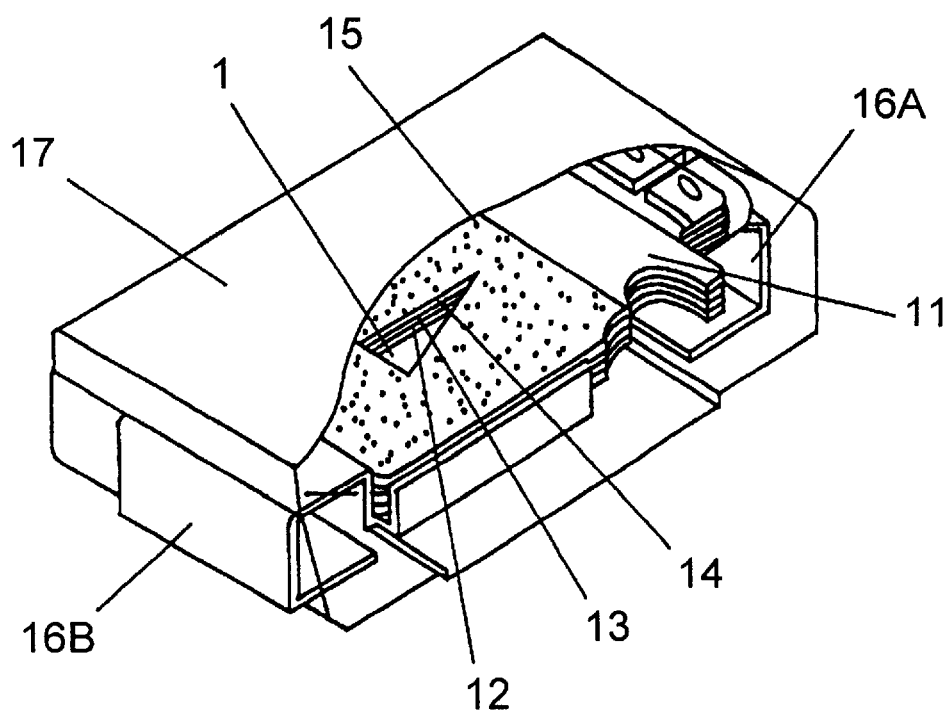
FIG. 5 is a perspective, partly in section, illustrating the configuration of a conventional solid electrolytic capacitor including the first exemplary embodiment of the present invention.

As described above, lots which are accepted based on the inspection results of the sample 1A are used in the series of processes comprising formation of the $MnO_2$ layer, conducting polymer layer, and cathode conductor layer, lead wire connection, and molding (the step of dividing a strip of aluminum foil 1 into pieces is omitted in FIG. 1) to complete the solid capacitor as shown in FIG. 5.

The solid capacitor as manufactured above demonstrates reliable characteristics. More specifically, a degree of degradation in characteristics of the aluminum foil in the $MnO_2$ formation process is confirmed to be negligible before the aluminum foil 1 is actually input to the $MnO_2$ layer formation process which has the largest degradative effect on the characteristics of the aluminum foil 1. A sampling inspection of a small portion of aluminum foil 1 enables it to be confirmed that the entire lot of sampled aluminum foil 1 is non-defective, thus safeguarding the manufacturing yield.

Since the quality of aluminum foil within the same lot is stable nowadays, the acceptable performance of final products may be assured by evaluating a small portion of the samples. The first exemplary embodiment describes the case of sampling one piece. To assure an even higher yield rate, test pieces may be sampled from several areas of the foil.

The first exemplary embodiment also describes the case of forming the $MnO_2$ layer as a base layer for the conducting polymer layer. However, other than $MnO_2$, conductive or semiconductive metal oxides including tin, zinc, tungsten, nickel, and vanadium may be used independently or as composite oxides for the base layer. If an non-aqueous solvent is used, a highly conductive metal oxide such as ruthenium oxide may also be used.

Second Exemplary Embodiment

A second exemplary embodiment is described with reference to FIG. 4. A point which differs from the first exemplary embodiment is an inspection method of the sample 1A sampled from each lot of aluminum foil 1. Other points are the same as those in the first exemplary embodiment, and thus only the point different is described below. Descriptions of other points are omitted.

The concept of the inspection method is the same as that shown in FIG. 2 described in the first exemplary embodiment. In this exemplary embodiment, however, a predetermined current is applied between the sample 1A and cathode plate 3 for a given period of time, and final voltage is measured.

Figure 4:
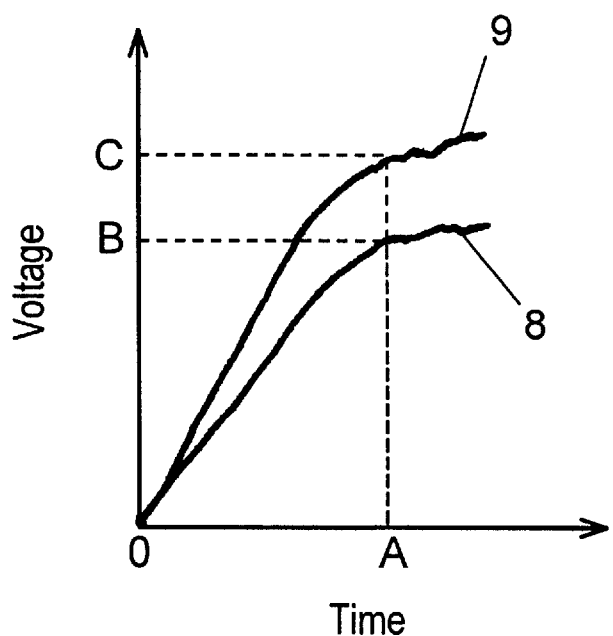
FIG. 4 illustrates characteristics of samples measured in the inspection in accordance with a second exemplary embodiment.

FIG. 4 shows an example of measurement results. A curve 8 shows the characteristics of the sample 1A and a curve 9 shows the characteristics of the sample 1A before forming the $MnO_2$ layer.

It is apparent from FIG. 4 that the anodized film is significantly damaged as a result of forming the $MnO_2$ layer on the surface of the aluminum foil 1 where anodized film is already formed. Withstand voltage of the aluminum foil thus drops even a steady current is applied. The second exemplary embodiment thus specifies a voltage level (Points B and C on the Y axis) before and after forming the $MnO_2$ layer during the given length of time as shown by Point A on the X axis in FIG. 4. This change in the voltage level or a lower limit of the voltage level (Point B) after the $MnO_2$ layer is formed is used as a control point for making decision. If the lot of aluminum foil 1 is determined as acceptable, this lot is input to the next process. Those determined as defectives are rejected and not input to the next process.

As described above, the method of manufacturing solid capacitors of the present invention samples a part of a lot of anode foil to be input to the $MnO_2$ layer formation process, which has the largest degradative effect on the characteristics of the anode foil in a series of manufacturing processes, before inputting the anode foil into this $MnO_2$ layer formation process. This sample goes through a predetermined inspection after the $MnO_2$ layer is formed, and whether the lot of sampled piece is input to the next process is determined based on this inspection results. Since a degree of degradation in characteristics of the anode foil during the $MnO_2$ layer formation process is confirmed to be negligible before the anode foil is actually input to the $MnO_2$ layer formation process, the present invention enables the manufacturing of solid electrolytic capacitors having both stable performance and quality at good yield.

Reference Numerals 1 aluminum foil
1A sample
2 electrolytic solution
3 cathode plate
4 test vessel
5 power source
6, 8 characteristics after forming the $MnO_2$ layer
7, 9 characteristics before forming the $MnO_2$ layer

What is claimed is:

1. A method of manufacturing solid electrolytic capacitors comprising:

sampling a part of a lot of foil for anodes for solid electrolytic capacitors;

forming a $MnO_2$ layer on a surface of said sampled anode foil by immersing said sampled anode foil into a solution containing dissolved manganese salts, removing said sample from said solution, and thermally decomposing said manganese salts;

inspecting said sampled anode foil on which said $MnO_2$ layer is formed; and determining whether to input the lot of anode foil from which said sample is taken, to a next process based on said inspection results.

2. The method of manufacturing solid electrolytic capacitors of claim 1, wherein said anode foil comprises a valve metal, a surface of said valve metal is roughened, and an anodized film is formed on said roughened surface.

3. The method of manufacturing solid electrolytic capacitors of claim 2, wherein said inspecting comprises measuring a current flowing in said sampled anode foil onto which said $MnO_2$ layer is formed, when an applied voltage is swept at a constant rate through an electrolytic solution.

4. The method of manufacturing solid electrolytic capacitors as defined in claim 3, wherein conditions for forming the $MnO_2$ layer on a surface of said sample are the same as those used in the formation of an $MnO_2$ layer in the formation process of the solid electrolytic capacitors.

5. The method of manufacturing solid electrolytic capacitors of claim 2, wherein said inspecting comprises measuring final voltage when a constant current is applied to said sampled anode foil onto which said $MnO_2$ layer is formed, for a given period of time in an electrolytic solution.

6. The method of manufacturing solid electrolytic capacitors as defined in claim 5, wherein conditions for forming the $MnO_2$ layer on a surface of said sample are the same as those used in the formation of an $MnO_2$ layer in the formation process of the solid electrolytic capacitors.

7. The method of manufacturing solid electrolytic capacitors as defined in claim 2, wherein conditions for forming the $MnO_2$ layer on a surface of said sample are the same as those used in the formation of an $MnO_2$ layer in the formation process of the solid electrolytic capacitors.

8. The method of manufacturing solid electrolytic capacitors of claim 1, wherein said inspecting comprises measuring final voltage when a constant current is applied to said sampled anode foil onto which said $MnO_2$ layer is formed, for a given period of time in an electrolytic solution.

9. The method of manufacturing solid electrolytic capacitors as defined in claim 8, wherein conditions for forming the $MnO_2$ layer on a surface of said sample are the same as those used in the formation of an $MnO_2$ layer in the formation process of the solid electrolytic capacitors.

10. The method of manufacturing solid electrolytic capacitors as defined in claim 1, wherein conditions for forming the $MnO_2$ layer on a surface of said sample are the same as those used in the formation of an $MnO_2$ layer in the formation process of the solid electrolytic capacitors.

11. The method of manufacturing solid electrolytic capacitors of claim 1, wherein said inspecting comprises measuring a current flowing in said sampled anode foil onto which said $MnO_2$ layer is formed, when an applied voltage is swept at a constant rate through an electrolytic solution.

12. The method of manufacturing solid electrolytic capacitors as defined in claim 11, wherein conditions for forming the $MnO_2$ layer on a surface of said sample are the same as those used in the formation of an $MnO_2$ layer in the formation process of the solid electrolytic capacitors.

* * * * *